US008287136B2

(12) United States Patent
Kobori et al.

(10) Patent No.: US 8,287,136 B2
(45) Date of Patent: Oct. 16, 2012

(54) DISPLAY APPARATUS

(75) Inventors: Tomoki Kobori, Kamakura (JP);
Satoshi Ouchi, Kamakura (JP); Koji Hirata, Yokohama (JP); Hidehiro Ikeda, Yokohama (JP); Kazuo Shikita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 646 days.

(21) Appl. No.: 12/426,638

(22) Filed: Apr. 20, 2009

(65) Prior Publication Data

US 2010/0079683 A1    Apr. 1, 2010

(30) Foreign Application Priority Data

Sep. 29, 2008 (JP) ................. 2008-249507

(51) Int. Cl.
*G03B 21/00* (2006.01)
*G03B 21/14* (2006.01)
*G03B 21/28* (2006.01)
*G01C 3/00* (2006.01)
*G01C 5/00* (2006.01)
*G01C 3/08* (2006.01)

(52) U.S. Cl. .......... 353/69; 353/98; 356/3.09; 356/5.02

(58) Field of Classification Search .............. 353/69, 353/70, 98, 99, 94; 359/223.1, 212.1, 196.1, 359/197.1, 213.1, 214.1, 226.2, 225.1, 199.1–199.4; 356/3.09, 445, 614–624, 5.01, 5.02
See application file for complete search history.

(56) References Cited

U.S. PATENT DOCUMENTS

2008/0013057 A1*  1/2008  Bullock ................. 353/121
2008/0266627 A1* 10/2008  Brown et al. ........... 359/198

FOREIGN PATENT DOCUMENTS

JP    2002328428 A  * 11/2002
JP    2006-343397      12/2006

OTHER PUBLICATIONS

"Omron Technics," vol. 44, No. 1 (Issue 145) 2004; w/ English abstract thereof.
"Laser ranging/image sensor," ECO SCAN, http://www.signal.co.jp/vbc/mems/app/item01_1.html, (Nippon Shingo K.K.).

* cited by examiner

*Primary Examiner* — William C Dowling
*Assistant Examiner* — Ryan Howard
(74) *Attorney, Agent, or Firm* — McDermott Will & Emery LLP

(57) ABSTRACT

A display apparatus is provided which, when projecting a video onto a curved surface of an object for display, can realize an undistorted display of the video. The measuring means outputs the distance information representing the distance to the object. Based on the distance information produced by the measuring means, the curved surface contour is detected with high precision. According to at least the detected curved surface contour distortions, pixels of the display image are unevenly rearranged to correct the video information before it is output. This arrangement realizes an undistorted display of video when the video is projected onto the curved surface of the object.

9 Claims, 6 Drawing Sheets

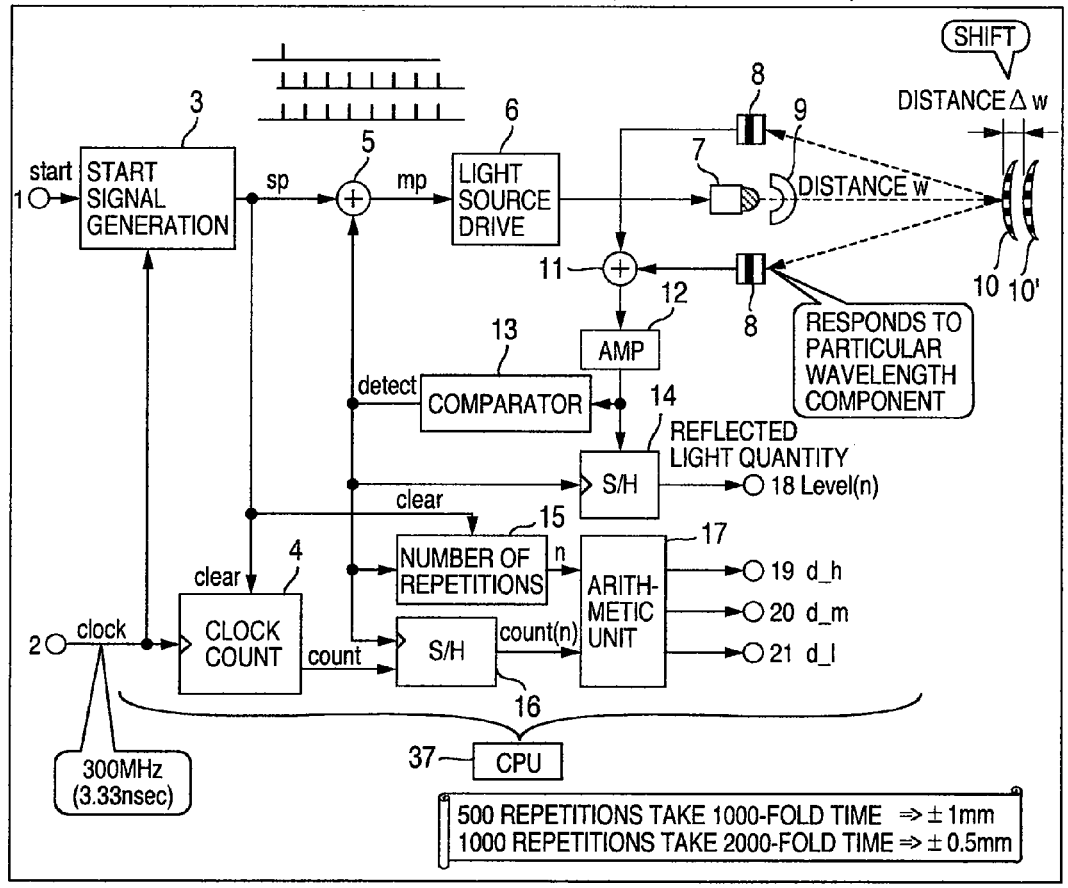
FIG.1 (CONFIGURATION OF 1)
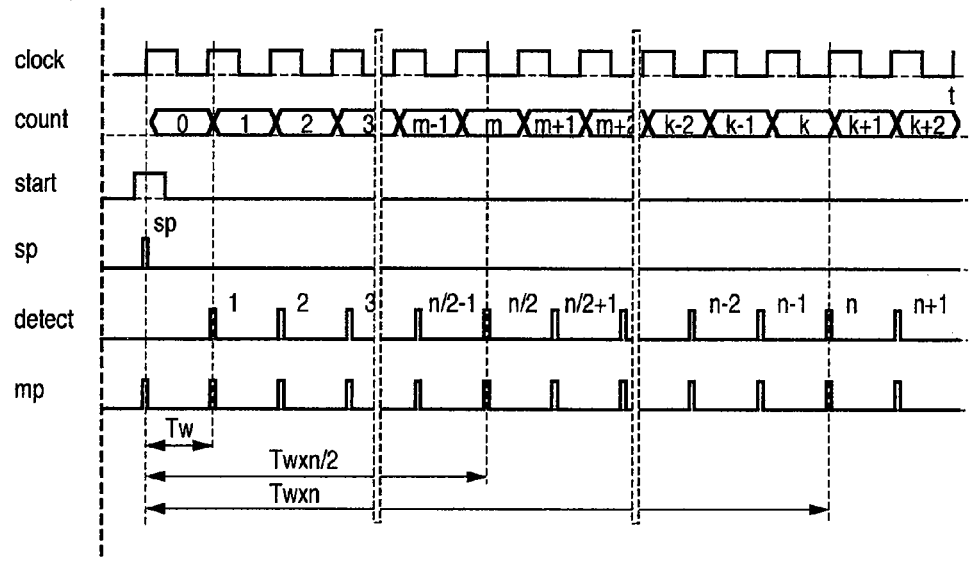
FIG.2 (TIMING DIAGRAM FOR DISTANCE w)

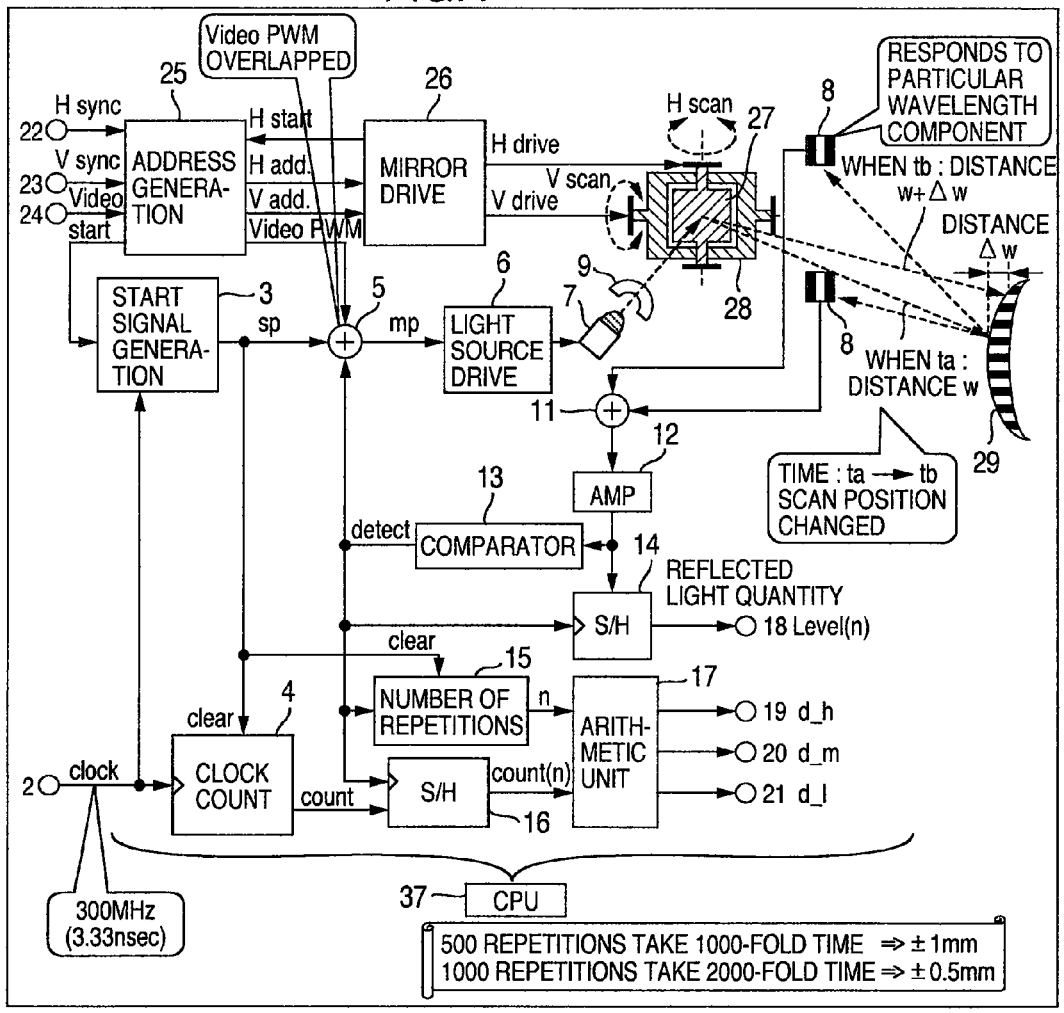
FIG.4 (CONFIGURATION OF 2:1/2/3-AXIS SCAN PANEL)
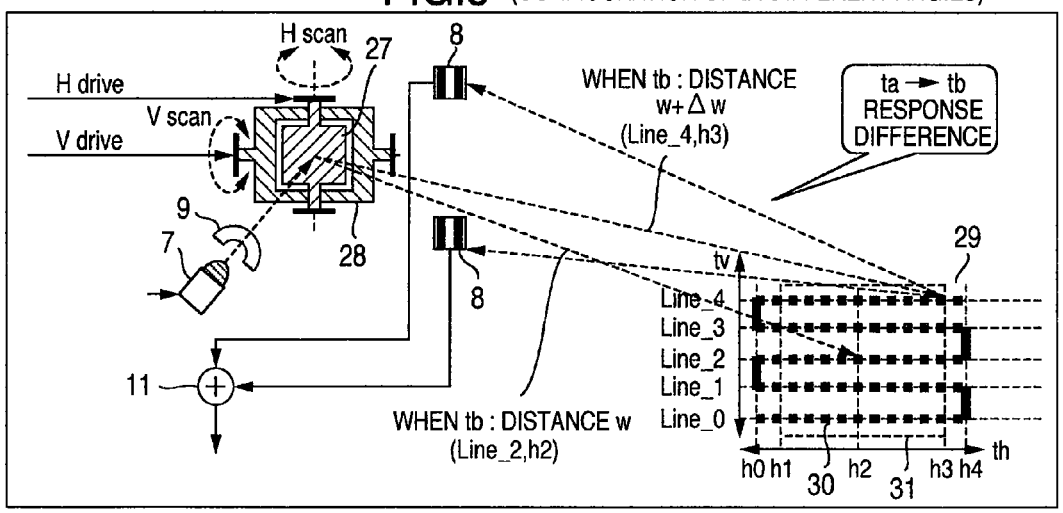
FIG.5 (CONFIGURATION OF 2 : DIFFERENT ANGLES)

(WHEN ta : DISTANCE w)

(WHEN tb : DISTANCE w+Δw)

DISPLAY APPARATUS

INCORPORATION BY REFERENCE

The present application claims priority from Japanese application JP2008-249507 filed on Sep. 29, 2008, the content of which is hereby incorporated by reference into this application.

BACKGROUND OF THE INVENTION

The present invention relates to a display apparatus that projects vibrating beams of light onto an object to form a video image thereon.

Conventional projection devices use a projection lens to project a video onto an object such as a screen or the like.

Under these circumstances, a display apparatus using MEMS (Micro Electro Mechanical Systems) devices and laser beams has come to be known and is disclosed in JP-A-2006-343397 (page 10, FIG. 1).

There have been proposed many kinds of measuring methods and devices. Among the methods using beams a light pulse flight hour measuring method is known. With both advancement of technologies in such MEMS field, semiconductor laser field or the like and reductions in product size or cost in recent years, these methods are being considered for application not only to business use but also to home use.

For example, a technology for improving a measuring precision is introduced in an article "OMRON TECHNICS, Vol. 44, No. 1 (145 issue) 2004". A distance image sensor operable based on the light pulse flight hour measuring method using MEMS and laser beams is also introduced at http://www.signal.co.jp/vbc/mems/app/item01_1.html (Nippon Shingo K. K).

As disclosed in JP-A-2006-343397 (page 10, FIG. 1), it has become possible to construct an image display apparatus which uses a uni-axial or dual-axial MEMS mirror reciprocally vibrating, or rocking and which projects a beam having been reflected at the MEMS mirror onto an object to form an image thereon.

Because the semiconductor technology advancement in recent years has improved an amount of output energy of a laser beam source and an electro-optical conversion efficiency, and also has improved a selectivity of an oscillated wavelength in a visible range, the image display apparatus is being improved more easily in a color reproducing range and a brightness range at low cost.

Since a projected light or image is formed as a beam, the image display apparatus is then able to produce, by beam projection, a focused image at any distance on an object of not only a flat shape but also various undulated contours.

However, when an image is actually projected onto the undulated or uneven surface of an object, the projected image on the object may get distorted because of differences of degrees of such undulation or unevenness over the recessed and protruding surfaces of the object. This is caused by the fact that the projected video is displayed enlarged in proportion to the projection distance.

The above-described display apparatus is simple in construction and thus can be made small, so that it can be brought in any desired place where it is used for projection display. Therefore, an object on which a projected image is displayed may be formed in a variety of shapes in addition to undulated contours, with its surface given a variety colors and glossiness levels of surface.

An object of this invention is to provide a display apparatus which, when projecting and displaying a video on a curved surface, realizes a displaying of an undistorted video by detecting the curved surface contour with high precision and unevenly rearranging (reverse-correcting distortions of) pixels of the image being displayed according to the detected curved surface contour (distortion), thereby widening the forms of use, and improving convenience of use, of the display apparatus.

SUMMARY OF THE INVENTION

To construct the display apparatus of this invention, a distance to, and a shape of, an object onto which an image is to be displayed are measured.

If the object is stationary and its distance is constant, the measurement of the distance needs only to be made during the image projection with an acceptable level of precision. However, if the object dynamically changes, for example, if distance from the object or shape of the object dynamically changes, it is necessary to consider the time taken by the measurement.

Therefore, even when an image is to be projected onto a rapidly moving object, the projected video needs to be displayed as a normal one by performing the distance measurement at high speed.

A measuring device for this distance measurement drives a light source by a light source drive means at a start timing of a start signal generation means and at a reflection timing at which a reflected beam is detected by a light quantity detection means and a comparison means.

Further, a clock counting means that counts the number of reference clocks from the start timing is used to determine the number of reflections "n" and a clock count value at each reflection timing. The clock count value averaged by the number of reflections "n" represents sum of both a known delay time within a circuit from one reflection timing to the next, and a flight of the light defined by light velocity and the distance from the object. Consequently, by subtracting the known delay time, it becomes possible to determine a light flying time, i.e., the distance to the object. According to the number of reflections, an average accuracy, i.e., a precision of measurement of the distance, can be determined. For each value of reflection number, distance information is output.

Further, an intensity of reflected light is measured by the light quantity detection means. According to information on the reflected light intensity, a light reflectance of the object can be determined.

A first display apparatus of this invention has the above measuring device. It also has a reflection mirror oscillating on one or two axes, a horizontal/vertical oscillation drive means to drive the reflection mirror, and an address generation means. The address generation means controls each of the start timing by receiving a horizontal synchronization signal (Hsync), a vertical synchronization signal (Vsync) and a display video signal and by controlling the horizontal/vertical oscillation drive means, a PWM modulation signal of the video signal and the start timing. The light beam from the light source is projected through the reflection mirror onto the projected image reception object.

Each of components of light beam reflected from the object reaches the light quantity detection means. Here, since the reflection mirror dual-axially oscillates, or rocks, a two-dimensional raster scan of the beam is performed over the projected image reception object. Therefore, light beam components are reflected from individual points (local points) on the object scanned by the two-dimensional raster.

In this construction, the time during which the apparatus is used as the measuring device and the time during which it operates as a single color video display apparatus are set apart. Of course, if a light source with a wavelength component different from that used for the display purpose is used for the measuring device, the distance measurement and the video display may be performed at the same time. The distance information and the reflectance information are generated for each location.

If the reflection mirror oscillates at a speed required by the video display, the beam position moves with elapse of time. This inevitably imposes a limitation on the number of repetitions "n". It is therefore desired that the distance measurement and the video display be executed independently.

A second display apparatus of this invention has the above measuring device and display apparatus and also has a light source for each of three primary colors of R/G/B. With this construction, not only can the apparatus display videos of three primary colors but, when used as a measuring device, it can perform the distance measuring and the surface reflectance measuring by using each of light components, i.e. the individual light sources for R/G/B. Here, the surface reflectance is evaluated for each of R/G/B component to obtain color information of the projected image reception object.

Further, the distance information and the reflectance information are obtained for each of the local points measured. Then, a local point reflectance determination means and a local point distance determination means are used to determine local point information. This is followed by a curved surface contour decision means matching the horizontal/vertical address representing the projection positions on the object to the local point information, thus determining the curved surface contour.

In the meantime, a curved surface distortion correction means corrects the centroid of pixels of the input video signal by using the determined curved surface contour to create a display video signal.

In general, a projection apparatus uses a projection lens, and it is therefore necessary for such apparatus to perform a focusing operation so that the projected video from this projection lens focuses on the projected image reception object.

However, since a display apparatus according to the present invention displays a video using a light beam such as a laser beam, it is then unnecessary to perform the focusing operation, as required by the general projection device, to display a projected video on the object.

However, if the object onto which the video is to be projected is curved or undulated on its surface, the projected video may look distorted.

Therefore, as described above, the curved surface distortion correction means is used to correct the video information based on the distance to the projected image reception object so that the projected video, when observed, does not look distorted or skewed.

While in the above explanation the means to correct distortions is called a "curved surface distortion correction means", the curved surface distortion correction means is not limited to only for a curved surface but it can also applies any non-planar surface to improve quality of the projected video based on the distance to the object and the contour information so that the projected video does not look distorted or skewed.

With the first display apparatus, the video display apparatus can be used as a measuring device. Further, since surface inclination information can be determined from a difference of degrees of the undulation or unevenness between two points, the light reflection quantity can also be determined from the surface inclination.

With the second display apparatus, the 3-primary color video display apparatus can be used as a measuring device. Further, when displaying video, the second display apparatus corrects the centroid of the video signal by using the curved surface information of the projected image reception object, thereby realizing a desired quality video display that conforms to the curved surface of the object. Further, since the color information of the object can be determined from the reflectance of each of the R/G/B components, it is possible to correct the video signal according to the color information of the object, allowing for easy enhancement of the image quality.

The configuration of this invention will be explained as follows from a different perspective.

A display apparatus of this invention comprises: a light source; a light source drive means to drive the light source; a reflection mirror to reflect an illuminating light from the light source and project it as a projected light onto an object; a mirror drive means to drive the reflection mirror to oscillate it in a non-resonance mode; an address generation means to input to the mirror drive means address information corresponding to coordinates of a position on the object where the projected light is thrown; a control means to control at least the light source drive means, the mirror drive means and the address generation means; a measuring means to output distance information representing a distance to the object; and a curved surface distortion correction means to output video information corrected according to at least the curved surface distortions; wherein the curved surface distortion correction means, after having received the address information from the address generation means and the distance information from the measuring means, outputs the corrected video information to the light source drive means so that the illuminating light from the light source driven by the light source drive means is projected onto the object.

In the above display apparatus, the measuring means comprises: a light quantity detection means to detect a reflected light quantity by receiving a reflected light of the projected light that has been projected onto an arbitrary point on the object specified by the address generation means; and an arithmetic operation means to calculate a signal to be output from the light quantity detection means; wherein the arithmetic operation means calculates, from the signal output from the light quantity detection means, a distance to the point on the object specified by the address generation means and outputs it as distance information.

The display apparatus further comprises: a curved surface contour decision means to check a surface contour of the object; a reflectance information detection means to output, based on the output of the light quantity detection means, reflectance information representing a reflectance; wherein the curved surface contour decision means uses the address information from the address generation means, reflectance information from the reflectance information detection means and the distance information from the arithmetic operation means to produce curved surface information including surface distortion information of the object, surface undulation information of the object and surface reflectance information of the object.

In the display apparatus, the curved surface information, the surface undulation information and the reflectance information are entered into the curved surface distortion correction means and then video information corrected by the curved surface distortion correction means is displayed.

In the display apparatus, the light source has light sources emitting at least three primary colors of R/G/B components; the individual means are constructed so as to measure each of the R/G/B components; the curved surface contour decision means outputs, for each light component, the curved surface information, the surface undulation information and the reflectance information of the object to which the light is to be projected; and the video corrected based on the curved surface information, the surface undulation information and the reflectance information is displayed.

The display apparatus further comprises a correction means, the correction means performing: an operation to expand or contract a pixel arrangement of the video information in a horizontal or vertical direction according to the curved surface information and the surface undulation information output from the curved surface contour decision means; an operation to correct a brightness according to the reflectance information; and a curved surface distortion correction operation to create the video information to be displayed; wherein the video information is corrected according to the surface contour of the object to create a video signal, which is then displayed on the object.

The measuring means comprises: a start signal generation means to generate a start timing signal specifying a timing at which to start the light source drive means; a light quantity detection means to detect at least a light reflected from the object after having been emitted from the light source; a comparison means to receive a detection signal from the light quantity detection means and generate a reflection timing signal; a clock counting means to count the number of reference clocks from the start timing signal; a repetition counting means to count the number of reflections n of the reflected light by counting the reflection timing signal; a holding means to hold a clock count produced by the clock counting means at a timing of the reflection timing signal; and an arithmetic operation means to calculate a distance based on the number of repetitions n from the repetition counting means and the clock count from the holding means; wherein the light source is driven by the start timing signal and the reflection timing signal; wherein the arithmetic operation means produces the distance information representing the distance to the object, based on the clock count and the period of the reference clock.

The arithmetic operation means of the measuring means determines a distance L according to a calculation formula shown below.

$$L=(3\times10^8)\times(1/F)\times(\text{Count}(n)/n)/2 \text{ [m]}$$

where F is a frequency of the reference clock [Hz], n is the number of repetitions, and Count (n) is a clock count (the number of clocks counted during the "n" repetitions).

The light source is an LED light source or a laser light source and its light is formed as a focused beam projected onto the object.

The distance measuring is performed at a different time for a different period than those for the video display. Based on the measured distance information, the light source drive means is modulation-driven to display video information on the object.

The first measuring device implements one of so-called light flight time measuring methods capable of measuring a light flight time, or a distance to a projected image reception object. The accuracy of an average value, i.e., the distance measuring accuracy can be improved by increasing the number of reflections. That is, for a frequency that provides a resolution capability required by a desired measuring accuracy, a substantially lower frequency can be used for the reference clock. Thus it is possible to build a measuring device with a high distance measuring precision using an inexpensive circuit system.

With this invention, when projecting a video onto a curved surface for display, it is possible to realize an undistorted display of the video, allowing for an improved usefulness and a wider range of use of the display apparatus.

BRIEF DESCRIPTION OF THE DRAWINGS

FIG. 1 is a configuration diagram showing a measuring device of the first embodiment of this invention.

FIG. 2 is a timing diagram that implements the first embodiment of this invention.

FIG. 4 is a configuration diagram showing a measuring device and a display apparatus using it according to the second embodiment of this invention.

FIG. 5 is a configuration diagram that implements the operation of the second embodiment of this invention.

DETAILED DESCRIPTION OF THE EMBODIMENTS

The present invention will be described by referring to the accompanying drawings.

Embodiment 1

In describing an example embodiment of the display apparatus, an embodiment of a measuring device will be first explained.

Figure 3:
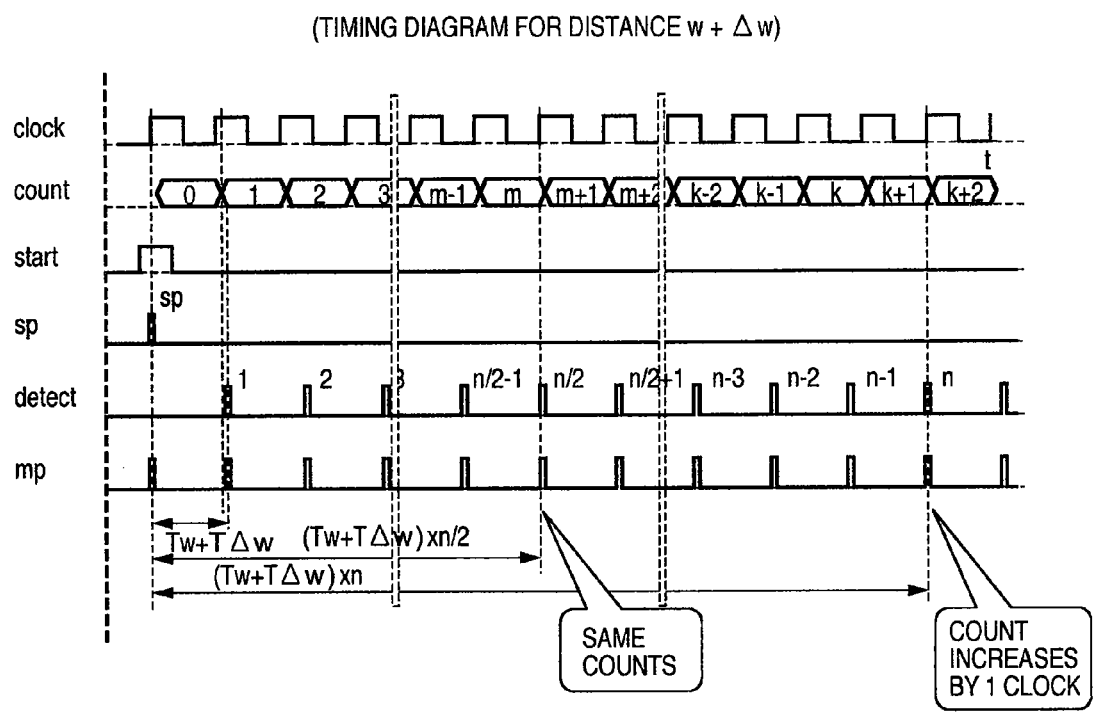
FIG. 3 is another timing diagram that implements the first embodiment of this invention.

FIG. 1 is a block diagram showing the measuring device of the first embodiment of this invention. FIG. 2 and FIG. 3 are timing diagrams at a measuring distance w and a measuring distance w+Δw.

In FIG. 1, denoted 1 is a start signal START, 2 a reference clock CLOCK, 3 a start signal generation circuit, 4 a clock counter, 5 a timing signal adder, 6 a light source drive circuit, 7 a light source, 8 a plurality of light amount detection units, 9 a collimate lens, 10 and 10' objects to be measured, 11 a detected light amount, or quantity adder, 12 a signal amplifier AMP, 13 a comparator, 14 a reflected light quantity sample-hold circuit, 15 a reflection counter, 16 a count value sample-hold circuit, 17 an arithmetic unit, 18 reflected amount information, and 19, 20, 21 pieces of distance information d_h, d_m, d_l with different detection precisions. Designated 37 is a central processing unit (abbreviated as "CPU") or a control unit that controls the above constitutional circuits or units. CPUs 37 shown in FIGS. 4, 8 and 9 similarly control constitutional circuits and means shown in these figures.

As to the differing precisions, the distance information d_h is one obtained by measuring the distance with a high precision. The distance information d_m is one obtained by measuring the distance with a medium precision, lower than the precision of the distance information d_h. Further, the distance information d_l is one obtained by measuring the distance with a low precision, lower than the precision of the distance information d_m.

As described above, the distance information d_h, d_m, d_l differs in their measuring precision. Since the period required for measuring the distance or time taken by the distance measurement and the number of times that the beam is reflected change, i.e. differ from each other, each of these distance information can be then appropriately selected for use depending on the distance to an object, the state of the surface of the object and the size of the display surface on the object.

(Preconditions of Embodiment)

Here in this embodiment, an example case will be explained in which a laser beam that can be easily modulated in light quantity at high speed is used as a light source. It is apparent that an LED, an ultrahigh pressure mercury lamp or a no-contact lamp may also be used along with optical components that focus emitted light into a beam or with light quantity modulation components.

Although two light quantity detection units 8 are shown in the drawing, one or more than two of them may be used. For simplicity of explanation, the distance "w" is shown set at 0.5 m, the Δw at 1 mm, and the reference clock CLOCK at 300 MHz. They may of course be set otherwise. A principle of the measuring method of this embodiment is a commonly known light pulse flight method. This principle will not be detailed here but a method of implementing it will be shown.

(Operation of Embodiment)

The start signal generation circuit 3 receives a start signal START from the outside not shown and generates a start pulse signal SP at a leading edge of the 300-MHz clock signal. The pulse width of the start pulse signal SP needs only to be sufficiently shorter than the time of flight Tw during which the light travels forward and backward over the distance w. If w=0.5 m as in this example, the time of flight Tw taken by the return flight over 1 m needs only to be less than about 3.3 nsec, calculated from the light velocity of $3.0 \times 10^8$ [m/s].

The clock counter 4 initializes itself by changing the start pulse signal SP to a Clear signal and counts the leading edge of the Clock.

The timing signal adder 5 adds a pulse timing of the start pulse signal SP and a repetition pulse signal Detect generated from the reflected pulse described later to generate an add-up pulse signal mp.

The light source drive circuit 6 oscillates the laser element light source 7 by pulses at a pulse timing of the add-up pulse signal mp. A collimate lens 9 may be added as necessary to create an output light of parallel beams. Then, the pulse light is reflected by an object 10 located a distance w in front and returns to the light quantity detection units 8. Here, the light quantity detection units 8 may be given a capability to distinguish and receive only a wavelength component of the light source 7, thereby preventing an undesired operation of the units that may result when they receive light components not related to the reflected light.

The detected light quantity adder 11 adds up one or more output values of the light quantity detection units 8 and the signal amplifier AMP 12 amplifies the added signal. As a result, if results of detection by these light quantity detection units 8 differ because of different directions of reflected beams, the light quantity can be detected correctly.

The comparator 13 compares the signal amplification results and outputs a repetition pulse signal Detect at a timing that the reflected light exists. At the same time, the reflected light quantity sample-hold circuit 14 holds the signal amplification result.

The reflection counter 15 performs an initialization operation of changing the start pulse signal SP to the Clear signal and counts the leading edges of the repetition pulse signal Detect to obtain the number of repetitions n. Then, the count value sample-hold circuit 16 samples and holds the count value of the leading edges of the repetition pulse signal Detect.

The clock count Count (n) averaged by the number of reflections n represents a time of flight of the light corresponding to a known communication delay time of a circuit from one reflection timing to the next, the light speed and the distance to the reflecting object. Subtracting the known circuit communication delay time can determine a light flying time, i.e., the distance to the reflecting object. The greater the repetition number n, the higher the distance detection precision. So, the detection accuracy is determined according to the number of repetitions, large, medium and small. And according to the detection precision, the distance information d_h, d_m, d_l can be obtained.

Further, the signal amplification result of the reflected light quantity sample-hold circuit 14 is determined as an intensity of the reflected light detected by the light quantity detection means. That is, the light reflectance of the object is determined as reflected amount information 18.

The reflected light quantity sample-hold circuit 14 may be called a reflectance information detection means and the reflected amount information 18 reflectance information.

Next, by referring to FIG. 2 and FIG. 3, the above construction will be detailed. FIG. 2 is a timing diagram at various points when the distance w=0.5 m. To simplify the explanation, it is assumed that individual circuit elements operate under an ideal condition of zero propagation time.

The round-trip distance is 2w=1 m and the round-trip time (light pulse flight time) Tw is $1/(3 \times 10^8)$, which matches the period of the reference clock of 300 MHz. So, the add-up pulse signal mp also matches the reference clock. That is, the number of repetitions n and the clock count (n) match each other regardless of the magnitude of the number of repetitions n. For the n repetitions, the repetition time is given by Tw×n, a product of Tw and n.

Therefore, the time it takes to complete 1,000 repetitions—obtained by counting the leading edges of the repetition pulse signal Detect—is determined by multiplying Tw of $1/(3 \times 10^8)$ seconds (i.e., approximately 3.33 nsec) by 1,000 as n.

Next, FIG. 3 shows another case in which an object 10' is located at a distance w+Δw. The light pulse flight time increases by TΔw, which corresponds to an additional distance Δw. For example, when Δw=0.5 mm, the increased flight time is 3.33 psec. After 1,000 repetitions as n, the accumulated time is 3.33 nsec, corresponding to an increase of one clock. That is, after 1,000 repetition, the clock count value becomes 1,001.

Similarly, when Δw=1.0 mm, the clock count value is 1,002. When Δw=−0.5 mm, the clock count value is 999. Thus, when 1,000 repetition is performed, the distance Δw can be measured with a precision of ±0.5 mm. When the repetition is 2,000, the precision is ±0.25 mm. Conversely, if the number of repetitions is reduced, the accuracy also decreases to ±1.0 mm for 500 repetitions and to ±50.0 mm for 10 repetitions.

For the sake of confirmation, the time taken by 1,000 repetitions—obtained by counting the leading edges of the repetition pulse signal Detect—is determined by multiplying Tw+TΔw of about 3.33 nsec+3.33 psec by 1,000. Namely, the flight time for 1,000 repetitions is about 3.33333 μsec.

Therefore, when the distance w=0.5 m, the time it takes to complete 1,000 repetitions of the round-trip flight over the distance w+Δw increases by 3.33 nsec, which is equal to a 1,000-time accumulation of about 3.33 psec. This is equivalent to an increase by one clock of 300-MHz reference clock.

The arithmetic operation means, 17, determines a distance L according to a calculation formula shown below.

From this it can be seen that once the clock count Count (n) from an object located at an unknown distance is determined for 1,000 repetitions, the unknown distance L [m] can be determined from the following equation.

$$L=(3\times10^8)\times(1/(300\times10^6))\times(\text{Count}(n)/1{,}000)/2 \text{ [m]}$$

From the above equation it is seen that to further improve the accuracy of distance measurement requires increasing the precision of counting Count (n), which can be achieved by further increasing the number of repetitions beyond 1,000.

It should be noted that the above equation has a precondition that the reference clock is 300 MHz. Therefore, by raising the reference clock can the precision of measurement be improved. This can be dealt with by changing the value of $1/(300\times10^6)$ in the above equation as necessary.

While the explanation of this embodiment is limited to a certain range of clock frequency and distance and to an ideal circuit with no delay, this embodiment can also be applied to cases where the circuit has delays. In such cases, the clock count can be adjusted by adding a delay corresponding to the number of repetitions to the repetition time. It is also possible to optimize the frequency of the reference clock used according to an increase or decrease in the number of repetitions or the distance to be measured or a combination of these. The measuring device according to the first embodiment of this invention described above implements one of so-called light flight time measuring methods capable of measuring a light flight time, or a distance to an object. With this device, the accuracy of an average value, i.e., the distance measuring accuracy can be improved by increasing the number of reflections.

That is, for a frequency that provides a resolution capability required by a desired measuring accuracy, a substantially lower frequency can be used for the reference clock. Thus it is possible to build a measuring device with a high distance measuring precision using an inexpensive circuit system.

Embodiment 2

FIG. 4 is a block diagram showing a display apparatus according to a second embodiment of this invention.

In FIG. 4, designated 22 is a horizontal synchronization signal (Hsync), 23 a vertical synchronization signal (Vsync), 24 a video signal, 25 a pixel address generation unit, 26 a horizontal/vertical oscillation drive unit, 27 a reflection mirror composed of a horizontal oscillation unit, 28 a vertical oscillation unit, and 29 an object onto which an image is to be projected.

FIG. 5 shows how a beamlike light flux emitted from the light source 7 and reflected by the reflection mirror 27 oscillating on two axes, scans over the object and how the projected beam is reflected from the object and returns to the light quantity detection units 8. Denoted 30 is a trace of a beam of light, and 31 an effective display area.

Figure 6:
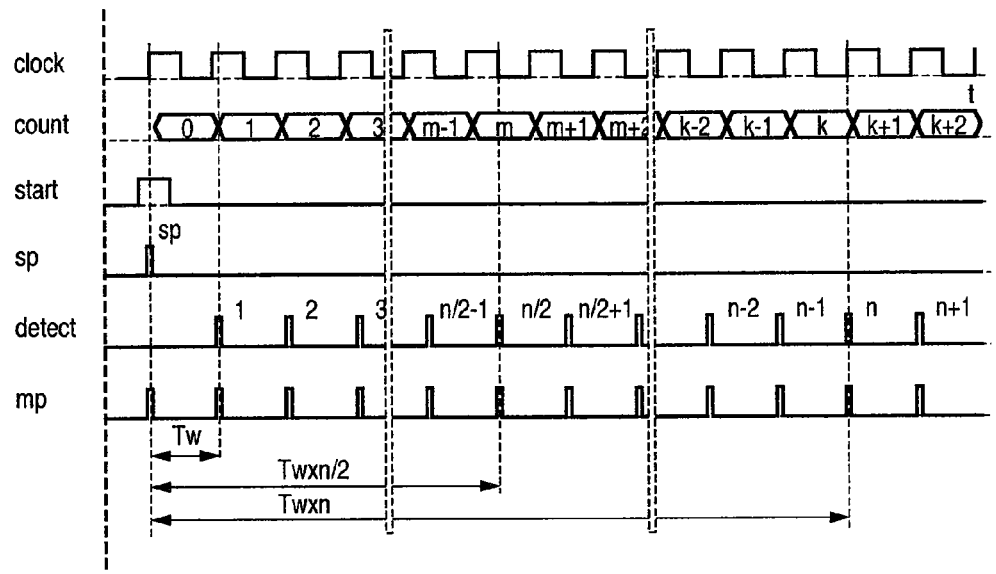
FIG. 6 is a timing diagram that implements the second embodiment of this invention.
Figure 7:
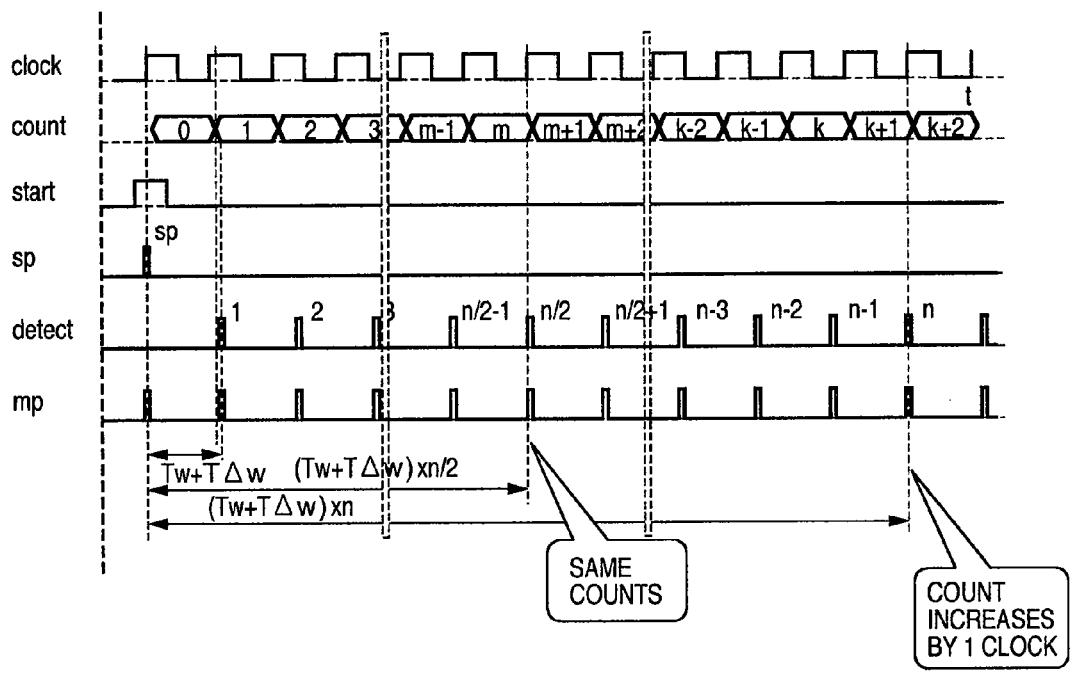
FIG. 7 is another timing diagram that implements the second embodiment of this invention.

FIG. 6 and FIG. 7 show operation timing diagrams for a distance w and a distance w+Δw.

This embodiment is not concerned with the shape of the reflection mirror 27 or whether it is operated on one axis or two axes, or a mirror operation method. For simplicity our explanation is limited to a panel on which a square fine mirror vibrates (oscillates) on two axes. Of course other constructions may be adopted. The reflection mirror 27 is driven by a method based on a known technology to which no particular reference is made. Reference numbers in this embodiment similar to the ones shown in the first embodiment represent elements that operate in the same way.

The pixel address generation unit 25 receives the horizontal synchronization signal (Hsync) 22, the vertical synchronization signal (Vsync) 23, the display video signal 24 generated in a circuit of FIG. 9 described later, and the horizontal oscillation reference timing Hstart of the reflection mirror 27 and, based on these signals, creates a horizontal oscillation address Hadd and a vertical oscillation address Vadd and also a modulation signal VideoPWM for modulating the number of grayscale levels of the display video signal.

The pixel address generation unit 25 outputs the start signal Start to perform the distance measurement. The modulation signal VideoPWM is added such that it is separated from the distance measuring period of the first embodiment. The difference from the first embodiment is that what is to be detected by the light quantity detection units 8 is those components of the light beam of the light source 7 which have reached, through the reflection mirror 27, the object onto which an image is to be projected for display.

As to the relation between the oscillation direction of the reflection mirror 27 and a scan locus 30 of a beam, the following explanation assumes that the vertical oscillation is defined as a V oscillation and the horizontal or lateral oscillation as an H oscillation. The H oscillation is performed in a resonance mode and the V oscillation operates in a non-resonance mode comprising a moving period and a hold period. The H oscillation operates sufficiently faster than the V oscillation. For example, when an image equivalent to VGA (640 pixels×480 lines) is displayed at an update speed of 60 Hz, the H oscillation operates at more than 15 kHz and the V oscillation at more than 30 Hz. So, during half the period of the V oscillation, more than 250 H oscillations take place.

For the sake of simplicity, this embodiment takes up an example case where the H oscillation occurs 2.5 times. In the scan locus 30 in the figure are also shown Line_0, Line_1, Line_2, Line_3, Line_4 for the V oscillation and h0, h1, h2, h3, h4 for the H oscillation. The H oscillation may also be in the non-resonance mode.

When a beam scans over the projected image reception object 29, the projection distance or beam flight time varies from one scan position to another depending on the inclination and contour of the undulated surface of the object.

Take for example a case in which when the central part (Line_2, h2) of the surface of the projected image reception object 29 is scanned at time of ta, the distance w is 1 m and in which when one end of the projected surface (Line_4, h3) is scanned at time of tb, the distance w+Δw is 1 m+1 mm. This case can be explained, as shown in FIG. 6 and FIG. 7, from the same standpoint of relationship between FIG. 2 and FIG. 3 of the first embodiment.

In this embodiment, however, the direction and light quantity of the reflected light vary depending on the angle between the beam and the projected image reception object 29 and the reflectance of the object, resulting in the reflected beam being unable to be detected by the light quantity detection units 8 in a worst case scenario. This may be dealt with by covering the projected image reception object 29 with a material that assures reflection when taking measurements.

It is also possible to take measurements by setting the horizontal oscillation in the non-resonance mode and fixing the projected position of the beam at each scan position. Of course, the horizontal oscillation may be set in the resonance mode. But this limits the number of reflections of beam at each scan position, i.e., sacrifices the measurement accuracy. For example, when the measurement of distance w is taken with the reference clock of 300 MHz and the one-pixel scan time of 1/30 MHz, the measurement can be made repetitively 10 times, i.e., an accuracy of ±50.0 mm can be assured.

Figure 9:
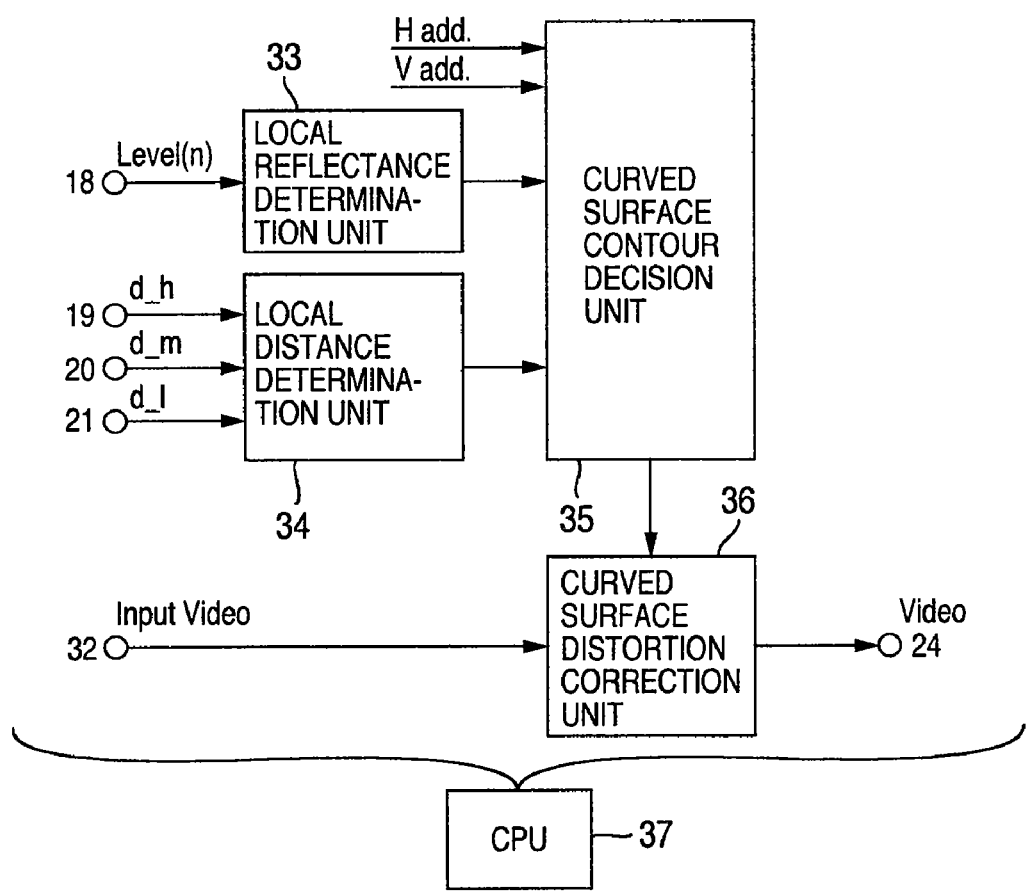
FIG. 9 is a configuration diagram to implement the third embodiment of this invention.

FIG. 9 is a block diagram showing how image distortions are corrected. Denoted 32 is an input terminal for an input video signal, 33 a local reflectance determination unit, 34 a local distance determination unit, 35 a curved surface contour decision unit, and 36 a curved surface distortion correction unit.

The local reflectance determination unit 33, the local distance determination unit 34 and the curved surface contour decision unit 35 obtain and finalize, at each position on the projected image reception object 29, the reflected amount information 18 and the distance information d_h, d_m, d_l and, from the horizontal oscillation address Hadd and the vertical oscillation address Vadd, determine and register coordinates of the projected image reception object 29, thereby determining the undulated and curved surface information and the reflectance. Further, the curved surface distortion correction unit 36, based on the curved surface information and the reflectance, rearranges the pixel positions of the input video signal and performs a signal amplitude correction to create the display video signal 24 through the reverse correction of the curved surface distortions.

Here, the image distortion correction is dealt with by a commonly known technology to which there is no particular condition. With this embodiment, the video display apparatus can also be used as a distance and reflectance measuring device. The use of this apparatus allows measurement of surface undulations of the projected image reception object 29 and its curved surface information (distortion information). With this apparatus, reverse-correcting the input video signal with the curved surface information to produce a video signal and projecting the display video signal onto the projected image reception object 29 can reproduce an undistorted video that conforms to the undulations and curves of the object surface. Further, even if there are reflectance variations on the object surface, the reverse correction according to the intensity of the beam assures a uniform brightness. Because surface inclination information can be calculated from a depth difference between two points, the light reflection quantity determined by the surface inclination can also be taken into consideration.

Embodiment 3

(Third Display Apparatus)

Figure 8:
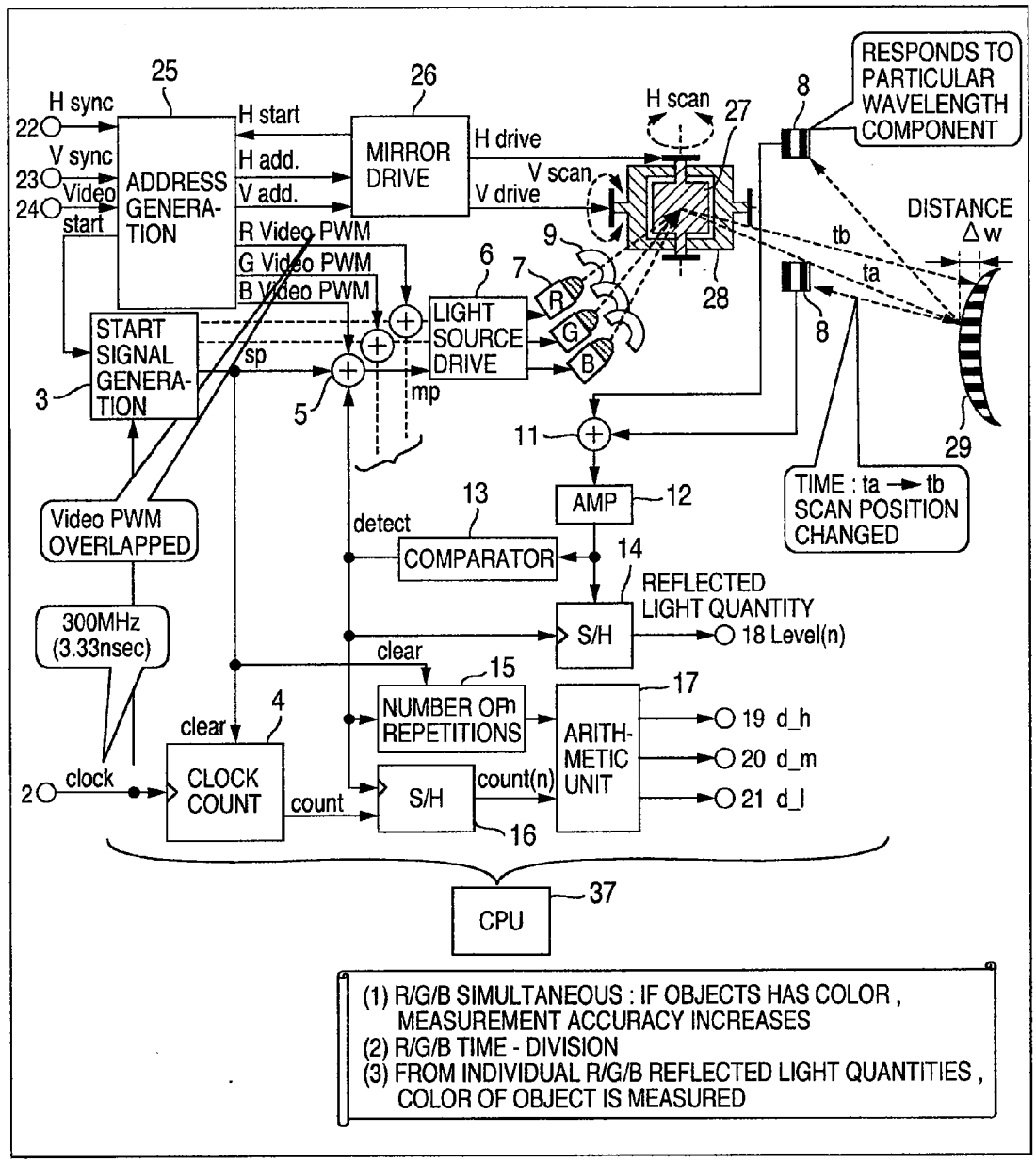
FIG. 8 is a configuration diagram showing a measuring device and a display apparatus using it according to the third embodiment of this invention.

FIG. 8 is a block diagram showing a display apparatus of the third embodiment of this invention. What is shown in FIG. 8 is comprised of the measuring device and the display apparatus described in the first and second embodiment of this invention. The third embodiment is characterized in that there are at least as many light sources 7 as three primary colors of R/G/B and that the light source drive circuit 6 drives the individual R/G/B light sources 7 independently or simultaneously in a way similar to the above. FIG. 9 shows the configuration of the image distortion correction circuit of the third embodiment, which is the same as that of the second embodiment, except that the light quantity detection units 8 not only detect the intensities of R/G/B light components but also distinguish them. The light quantity detection units 8 may of course be constructed to detect only the light intensities. With the above display apparatus of the third embodiment, in addition to surface undulation information of the projected image reception object 29 obtained from R/G/B light components, it is possible to measure reflectances for individual light components, i.e., color information on the projected image reception object 29. Further, the capability of the light quantity detection units 8 to distinguish between different colors makes it possible to make distance measurements using R/G/B component beams simultaneously and independently of one another. This in turn enables the detection accuracy to be improved three-fold for any number of repetitions n. Further, optimizing the color arrangement of the display video signal according to the surface color of the projected image reception object 29 can correct the color intensities, thus allowing a white color to be displayed even on an object surface with color variations,.

Further, since the distance and color variation measurements can be made at any desired time and for duration different from those of the video display, it is possible to reverse-correct the distortions of the video signal for its normal display by checking the detailed shape of the projected image reception object 29. Even when the projected image reception object 29 is moved, in addition to the display apparatus being relocated, the display of a video can immediately be adjusted to conform to the changed contour of the curved surface. It is also possible to add to the display apparatus a motion detector such as an acceleration sensor to detect the movement of the apparatus as a whole, so that upon detection of a movement the distance measurement can be taken.

With the arrangement described above, if the display apparatus or the projected image reception object 29 is moved, the apparatus can properly adjust a video being displayed by recognizing the changed contour of the curved surface and reverse-correcting the video signal accordingly.

The above embodiment can be applied to an image display apparatus of back projection or front projection type using an LED or a laser light source and to a camera device using information on distance to an object being photographed.

The display apparatus may use a MEMS technology in realizing a projection display. It is noted, however, that the apparatus is not limited to this technology. For example, a construction may be provided which projects an illumination light from a light source onto an object to form a focused light point on the object and which causes the address generation means to scan and drive the focused light over an address corresponding to the coordinates of that point. One such example involves introducing an illumination light from the light source into an optical fiber, projecting the light onto an object and scanning and driving the optical fiber over the display surface.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A display apparatus comprising:
a light source;
a light source drive means to drive the light source;
a reflection mirror to reflect an illuminating light from the light source and project it as a projected light onto an object;
a mirror drive means to drive the reflection mirror to oscillate it in a non-resonance mode;
an address generation means to input to the mirror drive means address information corresponding to coordinates of a position on the object where the projected light is thrown;
a control means to control at least the light source drive means, the mirror drive means and the address generation means;

a measuring means to output distance information representing a distance to the object, the the measuring means comprising:
  a start signal generation means to generate a start timing signal specifying a timing at which to start the light source drive means;
  a light quantity detection means to detect at least a light reflected from the object after having been emitted from the light source;
  a comparison means to receive a detection signal from the light quantity detection means and generate a reflection timing signal;
  a clock counting means to count the number of reference clocks from the start timing signal;
  a repetition counting means to count the number of reflections n of the reflected light by counting the reflection timing signal;
  a holding means to hold a clock count produced by the clock counting means at a timing of the reflection timing signal; and
  an arithmetic operation means to calculate a distance based on the number of repetitions n from the repetition counting means and the clock count from the holding means; and
a curved surface distortion correction means to output video information corrected according to at least the curved surface distortions, wherein:
the curved surface distortion correction means, after having received the address information from the address generation means and the distance information from the measuring means, outputs the corrected video information to the light source drive means so that the illuminating light from the light source driven by the light source drive means is projected onto the object,
the light source is driven by the start timing signal and the reflection timing signal, and
the arithmetic operation means produces the distance information representing the distance to the object, based on the clock count and the period of the reference clock.

2. A display apparatus according to claim 1, wherein the measuring means comprises:
  a light quantity detection means to detect a reflected light quantity by receiving a reflected light of the projected light that has been projected onto an arbitrary point on the object specified by the address generation means; and
  an arithmetic operation means to calculate a signal to be output from the light quantity detection means,
  wherein the arithmetic operation means calculates, from the signal output from the light quantity detection means, a distance to the point on the object specified by the address generation means and outputs it as distance information.

3. An display apparatus according to claim 2, further comprising:
  a curved surface contour decision means to check a surface contour of the object;
  reflectance information detection means to output, based on the output of the light quantity detection means, reflectance information representing a reflectance,
  wherein the curved surface contour decision means uses the address information from the address generation means, reflectance information from the reflectance information detection means and the distance information from the arithmetic operation means to produce curved surface information including surface distortion information of the object, surface undulation information of the object and surface reflectance information of the object.

4. A display apparatus according to claim 3, wherein:
the curved surface information, the surface undulation information and the reflectance information are entered into the curved surface distortion correction means and then video information corrected by the curved surface distortion correction means is displayed.

5. A display apparatus according to claim 3, wherein:
the light source has light sources emitting at least three primary colors of R/G/B components;
the individual means are constructed so as to measure each of the R/G/B components;
the curved surface contour decision means outputs, for each light component, the curved surface information, the surface undulation information and the reflectance information of the object to which the light is to be projected; and
the video corrected based on the curved surface information, the surface undulation information and the reflectance information is displayed.

6. A display apparatus according to claim 5, further comprising:
  a correction means, the correction means performing:
    an operation to expand or contract a pixel arrangement of the video information in a horizontal or vertical direction according to the curved surface information and the surface undulation information output from the curved surface contour decision means;
    an operation to correct a brightness according to the reflectance information; and
    a curved surface distortion correction operation to create the video information to be displayed,
    wherein the video information is corrected according to the surface contour of the object to create a video signal, which is then displayed on the object.

7. A display apparatus according to claim 1, wherein:
the arithmetic operation means of the measuring means determines a distance L according to the following calculation formula:

$$L = (3 \times 10^8) \times (1/F) \times (\text{Count}(n)/n)/2 \, [\text{m}]$$

where F is a frequency of the reference clock [Hz],
n is the number of repetitions, and
Count (n) is a clock count, with the number of clocks counted during the n repetitions.

8. A display apparatus according to claim 7, wherein the light source is an LED light source or a laser light source and its light is formed as a focused beam projected onto the object.

9. A display apparatus according to claim 7, wherein:
when the measuring means measures the distance, it is performed at a period of time different from or the same as a time period for the video display, and
based on the measured distance information, the light source drive means is modulation-driven to display video information on the object.

* * * * *